(12) United States Patent
Mayer et al.

(10) Patent No.: US 10,025,568 B2
(45) Date of Patent: Jul. 17, 2018

(54) DATABASE OBJECT LIFECYCLE MANAGEMENT

(71) Applicant: SAP SE, Walldorf (DE)

(72) Inventors: Martin Mayer, Heidelberg (DE); Ulrich Auer, Hockenheim (DE); Arne Harren, Walldorf (DE); Volker Driesen, Heidelberg (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 15/349,639

(22) Filed: Nov. 11, 2016

(65) Prior Publication Data

US 2018/0136913 A1    May 17, 2018

(51) Int. Cl.
G06F 9/44       (2018.01)
G06F 8/36       (2018.01)
G06F 17/30      (2006.01)

(52) U.S. Cl.
CPC .......... *G06F 8/36* (2013.01); *G06F 17/30292* (2013.01); *G06F 17/30312* (2013.01)

(58) Field of Classification Search
None
See application file for complete search history.

(56) References Cited

U.S. PATENT DOCUMENTS

| | | | |
|---|---|---|---|
| 7,526,468 B2 * | 4/2009 | Vincent | G06F 17/30595 |
| 7,865,874 B2 * | 1/2011 | Wookey | G06F 9/44536 |
| | | | 717/120 |
| 2003/0120688 A1 | 6/2003 | Hill et al. | |
| 2003/0140308 A1 * | 7/2003 | Murthy | G06F 17/30917 |
| | | | 715/234 |
| 2008/0040367 A1 * | 2/2008 | Bitonti | G06F 17/30607 |
| 2013/0282751 A1 * | 10/2013 | Lagerblad | G06F 17/30569 |
| | | | 707/769 |
| 2016/0294614 A1 * | 10/2016 | Searle | H04L 41/082 |
| 2016/0328273 A1 * | 11/2016 | Molka | G06F 9/505 |
| 2016/0359697 A1 * | 12/2016 | Scheib | H04L 63/1425 |
| 2017/0039260 A1 * | 2/2017 | Adya | G06F 17/30595 |
| 2017/0116206 A1 * | 4/2017 | Gumerato | G06F 17/30079 |
| 2017/0235559 A1 * | 8/2017 | Saenz | G06F 8/65 |
| | | | 717/171 |
| 2017/0235808 A1 * | 8/2017 | Salame | G06F 17/30581 |
| | | | 707/625 |
| 2017/0277437 A1 * | 9/2017 | Jones | G06F 3/0619 |

(Continued)

OTHER PUBLICATIONS

"Finding Cross Database Dependencies", Internet article, Jun. 2, 2011, Zakir Durumeric (Year: 2011).*

(Continued)

*Primary Examiner* — Daxin Wu
(74) *Attorney, Agent, or Firm* — Schwegman Lundberg & Woessner, P.A.

(57) ABSTRACT

In an example embodiment, relationships among a plurality of schemas are examined to remove any cyclic dependencies. Then a cycle-free graph of the cyclic dependencies is constructed. A first delivery mechanism is used to deliver software objects of a first database type to a first of the plurality of schemas in a software object database, using the cycle-free graph. A second delivery mechanism is used to deliver software objects of a second database type to a second of the plurality of schemas in the software object database, using the cycle-free graph.

20 Claims, 19 Drawing Sheets

(56) References Cited

U.S. PATENT DOCUMENTS

2017/0339630 A1* 11/2017 Ketonen .............. H04W 48/16

OTHER PUBLICATIONS

"European Application Serial No. 17001839.4, Extended European Search Report dated Mar. 12, 2018", 11 pgs.
"European Application Serial No. 17001852.7, Extended European Search Report dated Apr. 3, 2018", 9 pgs.
Liao, Chun-Feng, et al., "Automatic query rewriting schemes for multitenant SaaS applications", Automated Software Engineering, vol. 23, No. 4, (Mar. 21, 2015), 535-568.
Weissman, Craig, et al., "Design of the Force.com Multitenant Internet Application Development Platform", SIGMOD-PODS: Compilation Proceedings of the International Conference on Management Data & 28th Symposium on Principles of Database Systems, (Jun. 29, 2009), 889-896.

* cited by examiner

DATABASE OBJECT LIFECYCLE MANAGEMENT

TECHNICAL FIELD

This document generally relates to methods and systems for use with database objects. More particularly, this document relates to lifecycle management for database objects.

BACKGROUND

Relational databases store data in tables, with each table having one or more keys relating the table to other tables in the database. Requesting data from a relational database involves querying a relational database management system (RDBMS) using a relational database query language, such as Structured Query Language (SQL).

In recent years, software development, and specifically business-related software application development, has moved towards a cloud-based environment where developers interact with an application server to create and manage software objects related to the applications being developed. A programming language for developing applications on the application server is utilized by the developer to create and manage the software objects. An example of such a programming language is the Advanced. Business Application Programming (ABAP) language, developed by SAP SE, of Waldorf, Germany.

These application servers have traditionally stored the software objects in relational databases on traditional non-volatile storage devices (e.g., hard drives), and thus ABAP was designed to store data types compatible with relational databases. However, recent advances in computer memory have heralded the introduction of in-memory databases, where the data is persisted in system memory, such as random access memory (RAM), providing a database system that is much faster to access than traditional database systems. An example of such an in-memory database is the HANA database system, developed by SAP SE of Waldorf, Germany.

In-memory databases allow for new features and data formats not previously available for relational databases, such as multi-schema support. While ABAP can be updated to support the new features and data formats supported by in-memory databases, these new features and formats can change drastically as in-memory databases evolve. Each new version of an in-memory database could support a whole host of new features and formats, and redesigning ABAP to natively support the new features and formats each time such a new version is released is not practical.

BRIEF DESCRIPTION OF DRAWINGS

The present disclosure is illustrated by way of example and not limitation in the figures of the accompanying drawings, in which like reference numbers indicate similar elements.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a dependency model is defined between objects managed by different infrastructures to provide top-level management to orchestrate the different infrastructures. The database schema is offered to the application developer as a development artifact. The application server and database server get individual schemas for their objects and exclusive management control for their objects. A central infrastructure can then manage cross-schema dependencies in the development phase and later in the deployment phase. Schema names can be handled via logical names during development and physical names during deployment with a schema mapping in between.

Objects created by the application server can be assigned to one of the schemas. One schema can contain database objects defined in the application server or in the database server development environment. Database objects access other objects within the same schema.

Figure 1:
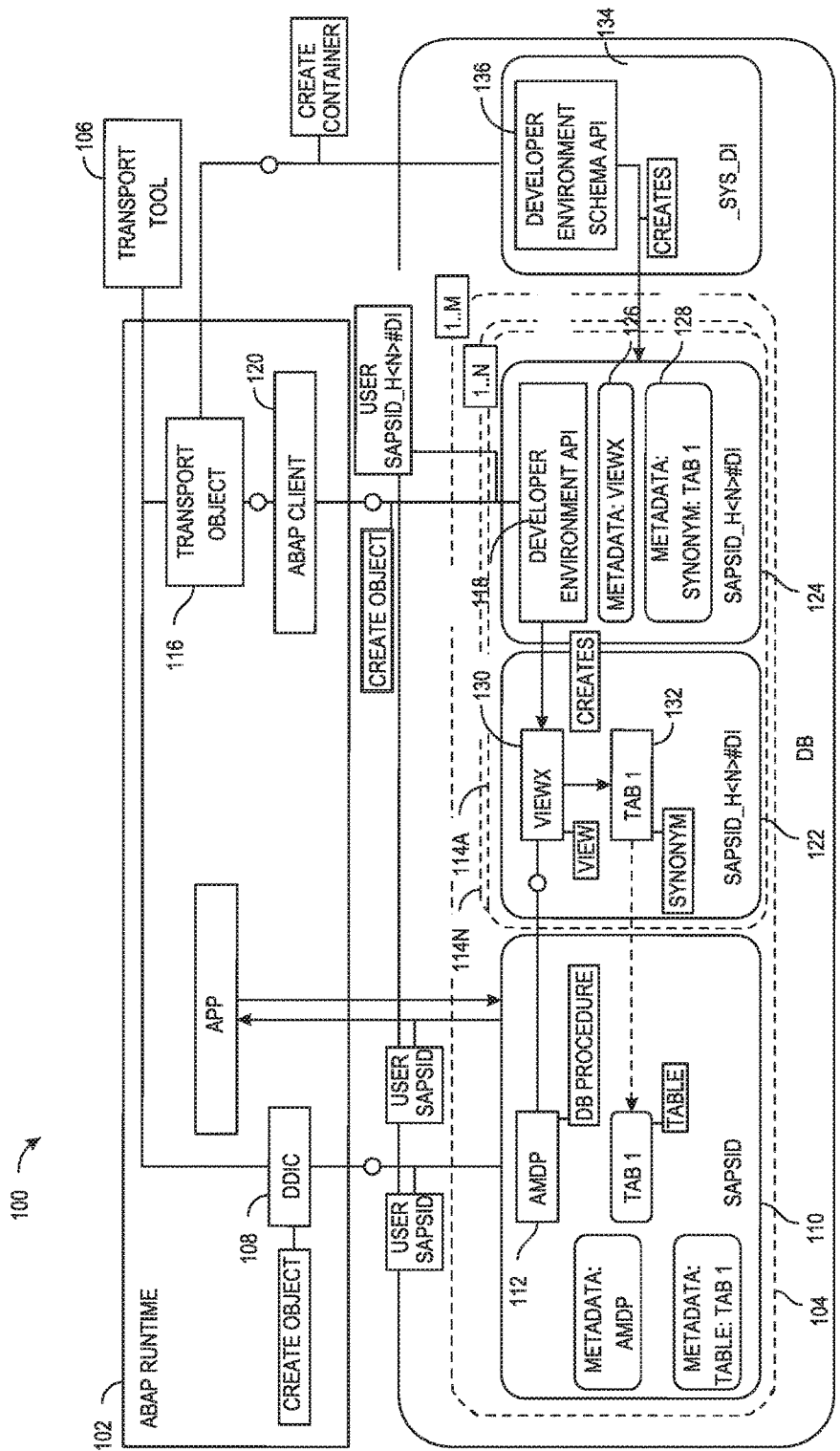
FIG. 1 is a block diagram illustrating a system for managing multiple schemas in a database, in accordance with an example embodiment.

FIG. 1 is a block diagram illustrating a system 100 for managing multiple schemas in a database, in accordance with an example embodiment. The system 100 includes an ABAP Runtime 102, a database 104, and a transport tool 106. The ABAP Runtime 102 contains a data dictionary (DDIC) 108. The database 104 includes a database instance 110. The database instance 110 may include a schema and may be considered the "old" way of managing a schema; specifically, the DDIC 108's job is to create objects in accordance with developer requests and to manage these objects within the database instance 110, but the database instance 110 does not utilize any of the more newly defined capabilities of more recent databases. In some example embodiments, the database instance 110 may have a schema that was created prior to a release of an in-memory database, although in other example embodiments, the database instance 110 merely has a schema that lacks some capabilities of a more newly defined schema. The database instance 110 includes an ABAP managed database procedure (AMDP) 112, which is created via ABAP at a first call to the procedure.

In an example embodiment, the database 104 further includes a plurality of additional database schemas 114A-114N that contain capabilities not found in the schema in the database instance 110. The ABAP Runtime 102 further contains a transport object 116, which is an ABAP module used to store object definitions and deploy objects to the additional database schemas 114A-114N via a developer environment application programming interface (API) 118 via an ABAP client 120, which will be described in more detail later.

Each of the additional database schemas 114A-114N contains an underlying schema 122, where the objects created at the ABAP client 120 are stored. The developer environment API 118 is part of a metadata catalog 124, which also includes view definitions 126 and table definitions 128, which are used to create view instances 130 and view tables 132, respectively.

The database also includes a library 134 which contains a developer environment schema API 136, which creates containers including the additional database schemas 114A-114N.

The developer uses the transport tool 106 to move object definitions to one or more of the additional database schemas 114A-114N. For example, the developer may create a table definition and define what types of data go into the table and how the table is organized, and then this table definition may be stored in the appropriate additional database schema 114A-114N to be used to create table instances at runtime. A similar process can be undertaken to define views. The transport tool 106 actually manages more than just storage of the table and view definitions, but actually can manage the lifecycle of these objects, from development, to testing, to production, and eventually to deployment.

Figure 2:
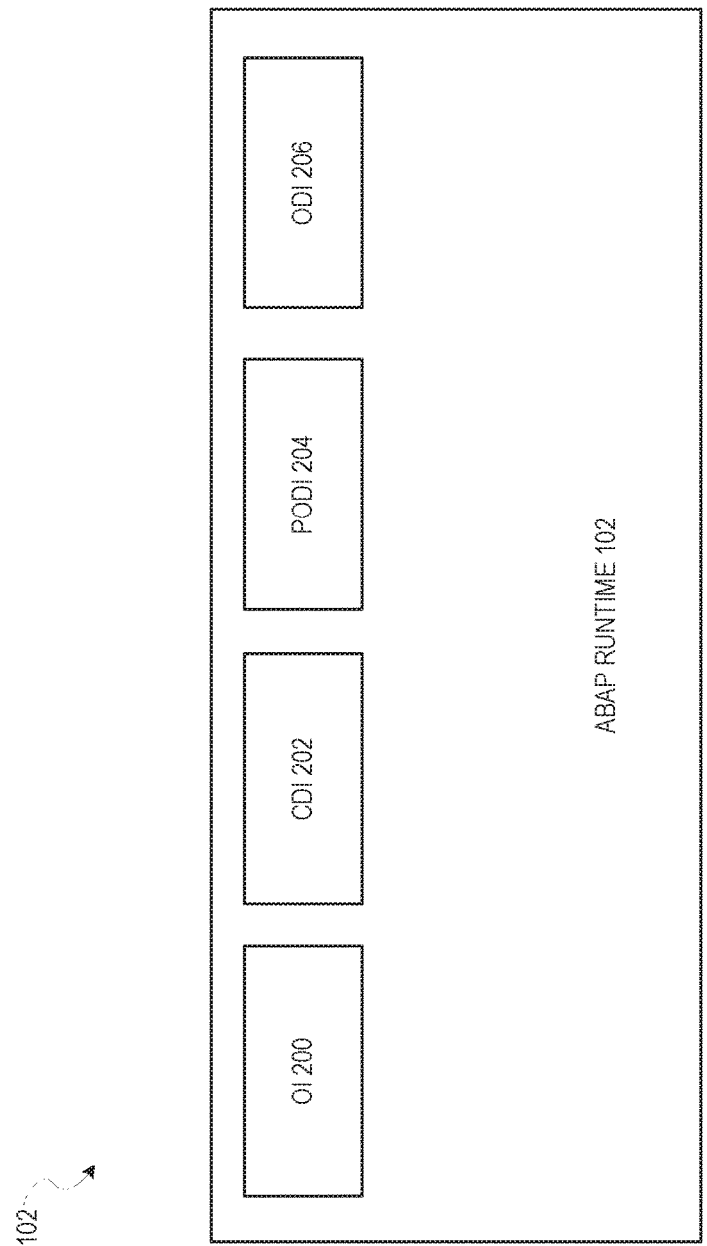
FIG. 2 is a block diagram illustrating an ABAP Runtime in more detail, in accordance with an example embodiment.

FIG. 2 is a block diagram illustrating the ABAP Runtime 102 in more detail, in accordance with an example embodiment. The ABAP Runtime 102, in addition to the components described in FIG. 1, includes an orchestration infrastructure (OI) 200, a database container delivery infrastructure (CDI) 202, a database proxy delivery infrastructure (PODI) 204, and a database object delivery infrastructure (ODI) 206.

The OI 200 orchestrates two or more independent development and delivery mechanisms for database content (DDMs), such as tables and views. Each delivery mechanism can compute dependencies and deploy content within its target environment. The OI 200 assigns one or more containers (e.g., database schemas) to each DDM. The OI 200 ensures cycle-free dependencies between objects between different containers by limiting dependencies of objects belonging to two different contains in such a way that objects in a first container can depend on objects in a second container, but the objects in the second container cannot depend on objects in the first container. The OI 200 then computes a graph of container dependencies and orchestrates development via the individual DDMs along the graph. Within each DDM, development objects referencing objects in other containers are created first. This is described in more detail below.

The CDI 202 allows users to define a container logical name, container dependencies, and container attributes; activates a container by creating a database schema with a physical name; and stores the mapping of the logical to the physical name.

The PODI 204 allows users to define a database object assigned to a logical container, referencing another database object assigned to another logical container. The PODI 204 verifies that containers are only referenced unidirectionally and computes a cycle-free graph of container dependencies. In some example embodiments, upon activation of a proxy object, the PODI 204 activation resolves the logical container names defining the physical container names and creates the object in the physical container it is defined for, referencing the object in the other physical container.

The ODI 206 allows users to specify a single object or a multitude of objects being newly created, changed, or deleted. The ODI 206 further locks objects against changes by other users, assigns the objects to a change list, exports the single or multiple object definitions referenced in the change list from one system, and imports them into another system. The ODI 206 also titivates in the other system the single or multiple objects by mapping the logical container name specified in the object definition to the physical schema name corresponding to the logical schema name in the other system, and creating the object or altering the object in the physical database container. The object activation may be sorted along the container dependency graph, starting with containers without references to other containers, continuing with containers which have only references to already deployed containers, and continuing for all containers specified by objects along the container dependency. In some example embodiments, the ODI 206 utilizes the physical name to logical name mapping in the CDI 202 to create objects in the respective physical container.

It should be noted that, while in some embodiments, some or even all of the OI 200, CDI 202, PODI 204, and ODI 206 work together, in some example embodiments these may be standalone components that can operate independently of, or even without the presences of, any of the other of the components.

In an example embodiment, the concept of a logical schema name in the application is introduced. All development artifacts then use this logical schema name. During deployment, a physical schema with a unique name is created and assigned to the logical schema name. During a zero downtime upgrade, an alternative physical schema with another name can be created and assigned to the logical name. This allows developers to create objects that are machine-agnostic, with the physical names for the schemas containing these objects being resolved at deployment.

The application code in the application server accesses the database schema by schema resolution, retrieving the physical schema name by specifying the desired logical schema name. The application server infrastructure either returns the standard physical schema name or the temporary physical schema name during a zero downtime upgrade.

The database objects and database code deployed via the database development environment define database synonyms or projection views for objects to be consumed from other database schemas using the logical schema name. The synonym and projection view is configured at creation time by resolving the logical name specified with the physical name used in the deployment. During a zero downtime upgrade deployment, the objects are created with the temporary schema name defined by the zero downtime updated procedure.

A schema development artifact is managed in the application server development environment. A logical schema can be defined. Upon deployment, the application server deployment creates a physical schema (defined name, globally unique identifier (GUID), computed name out of logical name, system identification, and other parameters) and stores the mapping between the logical schema name and the physical schema name in a mapping table. Upon access to the schema, the application server database interface resolves the logical name provided and accesses the database with the matching physical schema name.

A developer environment managed schema can access objects in the DDIC managed schema (in the database instance 110) or one of the additional database schemas 114A-114N. The developer declares which other schemas are accessible. This information is added to the schema development artifact.

In an example embodiment, each of the additional database schemas 114A-114N may only declare access to another of the additional database schemas 114A-114N if the other additional database schema 114A-114N has not yet declared access to this schema. In other words, a directed graph of dependencies is used, but not cyclic dependencies. This can be verified by two mechanisms: at the development tool for schema definitions and/or at the schema activation process.

In this manner, it only becomes necessary to check for dependencies among the schemas, and not among individual objects, due to the presence of the proxy objects, which are subject to the logical schema-physical schema mapping.

Figure 3:
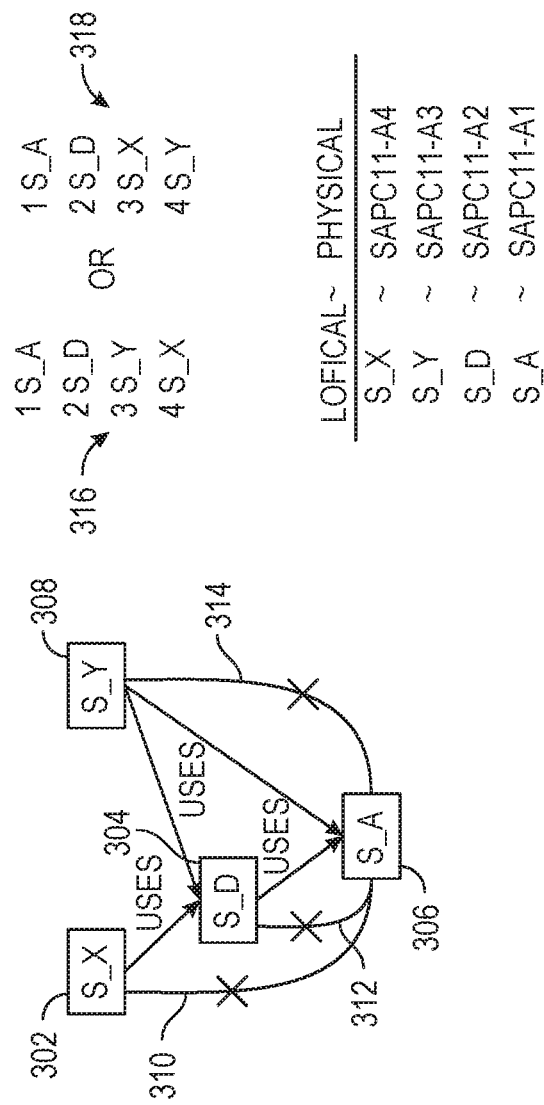
FIG. 3 is a diagram illustrating an example of a cycle-free graph, in accordance with an example embodiment.

FIG. 3 is a diagram illustrating an example of a cycle-free graph 300 in accordance with an example embodiment. This example assumes the following guidelines:

Schema S_d may access S_a.
Schema S_x may access S_d.
Schema S_y may access S_d and S_a.
Then, S_d must not access S_x or S_y.
Also, S_a must not access or S_d, S_x, S_y.

The cycle-free graph 300 is then computed using these guidelines. Here, for example, S_x 302 uses S_d 304, which uses S_a 306. S_y 308 uses both S_d 304 and S_a 306.

Also depicted in FIG. 3 are three dependencies that are not permitted, lest the cycle-free graph 300 no longer be cycle-free. Here, dependency 310, where S_a 306 uses S_x 302, is not permitted. Likewise, neither dependency 312, where S_a 306 uses S_d 304, nor dependency 314, where S_a 306 uses S_y 308, is permitted.

The deployment sequence is as follows. First the DDIC managed schema is created, if required. The mapping between the logical schema name and the physical schema name is entered into the schema administration infrastructure. Then the objects are deployed to the DDIC managed schema.

Afterwards, the additional database schema objects are evaluated and new schemas are created if required. The mappings between logical schema names for these additional schemas and corresponding physical schema names are entered into the schema administration infrastructure.

Then the schema dependency graph is computed and mapped to an ordered list of schemas. This may be accomplished by traversing the cycle-free graph, such as the cycle-free graph 300 of FIG. 3, in either a breadth-first search or a depth-first search manner. The two different computed deploy sequences of content are depicted at 316 and 318 in FIG. 3. 316 depicts the deploy sequence according to a breadth-first search, whereas 318 depicts the deploy sequence according to a depth-first search.

Then the content is deployed to the additional schemas along the defined sequence. For each schema, first the synonyms and projection views are created. The logical schema name specified in the synonym definition or projection view definition is resolved against the physical schema name from the schema mapping. Then the schema local objects are deployed. Finally, schemas are dropped if required if the schema is empty and not referenced by other schemas).

Upon the application accessing an AMDP 112 (FIG. 1), which accesses objects in one of the additional schemas, the corresponding AMDP 112 is created in the DDIC managed schema. This object facilitates access to the newer object. Upon creation of the AMDP 112, the logical schema name specified in the database procedure definition is resolved against the physical schema name from the schema mapping. Thus, the full creation of the newer object is delayed until after deployment of the software. The AMDP 112 is only a metadata definition until runtime. Then when the AMDP 112 is first accessed to load a database object, a database procedure is created. The database procedure specifies the logical schema name, and then the physical schema name is resolved. Thus, the database object with the physical schema name is only created on first use.

In other words, the dependencies that are permitted upon deployment include only those dependencies that are such that a cycle-free graph can be created for the dependencies. The implementation of the other dependencies is delayed until first use.

Turning now to the database object lifecycle, the database development environment is used to create objects in the newer schema. This database development environment may be, for example, the HANA Studio™ application or WebIDE™ application from SAP SE of Waldorf, Germany. WebIDE™ works on a set of files in a directory, the files containing the descriptions of the objects. The tiles are uploaded to an ABAP application server object transport infrastructure, which stores the files in a database table in an application server-based repository of object definitions.

If an object is changed by a developer, the object is locked in the ABAP application server against use by other developers. The object is then read from the repository and written to a file system, where the database development environment can read and modify the file. Once the developer is done, the file can be uploaded again. The object lock is then removed and the object is written to a transport order.

The objects are assigned to a logical schema. The transport object 116 can activate the objects in the schema. The logical schema is mapped to the physical schema in this database installation.

Objects referencing another schema, such as synonyms or projection views, are defined with the name of the logical schema they wish to reference. The transport object 116 can activate objects referencing other schemas by mapping both logical schema names to the respective physical schema names: the schema the object belongs to and the schema of the referenced object.

Object transport means the objects are written in the development system into an external file. This file can be read by the transport tool in a test or production system. The transport tool then reads this file, and writes the object definition in a new inactive version in the object repository in the application server. Then the object is activated. The object definition is written to the HDI interface in the database and then the object is created (or altered) in the HDI schema. Single-object transport allows for single-object delivery, such as for patching. It also allows different developers to individually decide on the point in time when an object is transported from development to test.

A product is delivered via a transport (plus other data). The transport can contain a schema definition and objects for the schema. The product can also define other products as installation prerequisites. The other products can have their own schema definitions.

During a product upgrade, the new version is delivered with a new transport, which can contain the same or altered definitions of schemas and objects. The development tool creates a new schema if required and creates objects in the new schema. It also updates objects in the already existing schema, if needed.

Figure 4:
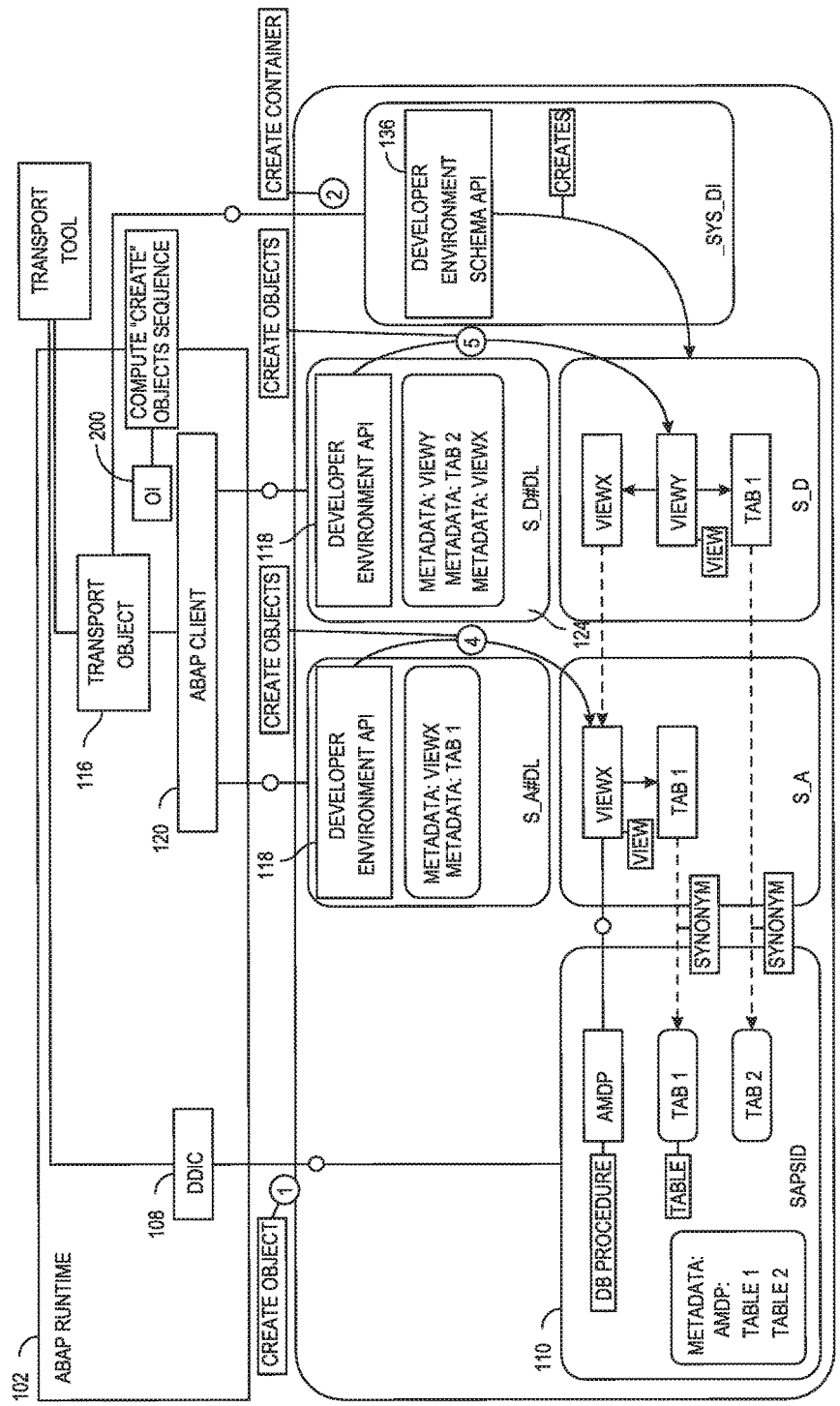
FIG. 4 is a block diagram illustrating operation of an orchestration infrastructure (OI) within the ABAP Runtime, in accordance with an example embodiment.

FIG. 4 is a block diagram illustrating operation of the OI 200 within the ABAP Runtime 102, in accordance with an example embodiment. First, objects are created through the DDIC 108 and stored in the database instance 110. When the transport object 116 creates a container for the ABAP client 120, the developer environment schema API 136 creates the metadata catalog 124 for each additional database schema in the database, and the OI 200 computes a "create objects" sequence from the container. As described earlier, objects can depend on objects (a) in the same container; or (b) in another container, if the container the object resides in has declared a usage dependency to the other container.

Figure 5:
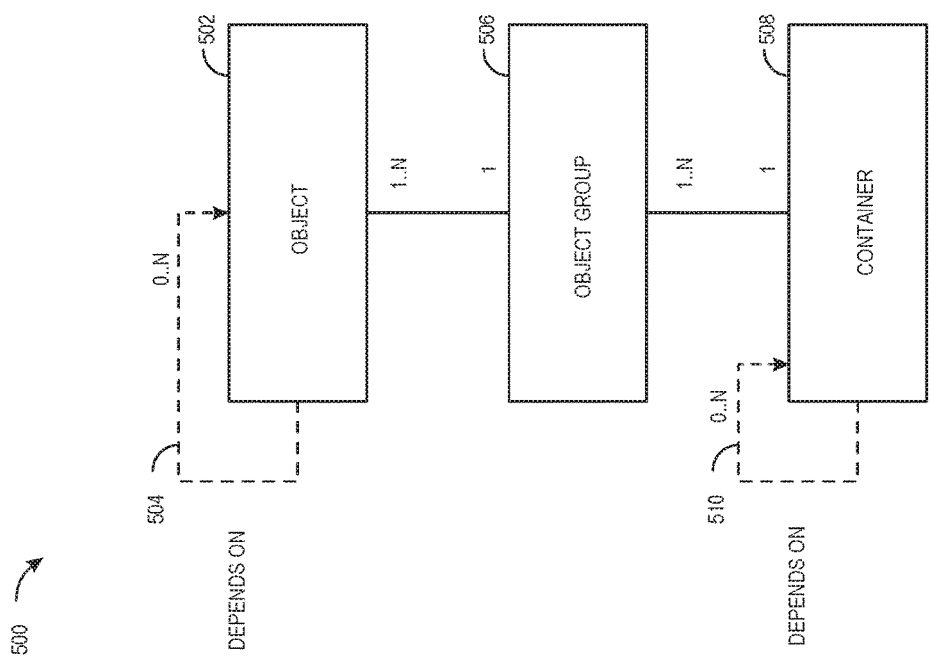
FIG. 5 is a block diagram illustrating a generic dependency graph, in accordance with an example embodiment.

FIG. 5 is a block diagram illustrating a generic dependency graph 500, in accordance with an example embodiment. Each object 502 may have a dependency 504 on one or more other objects in the same category, and/or may be a part of an object group 506 in a container 508 that itself has a dependency 510 on one or more other containers. This "create object" sequence is essentially a deploy sequence. Deployment may occur on a container-by-container basis.

Deployment involves the developer environment API 118 first creating the view instances 130 and view tables 132. Then the schema local objects are deployed. Finally, schemas are dropped if required (e.g., if the schema is empty and not referenced by other schemas).

Figure 6:
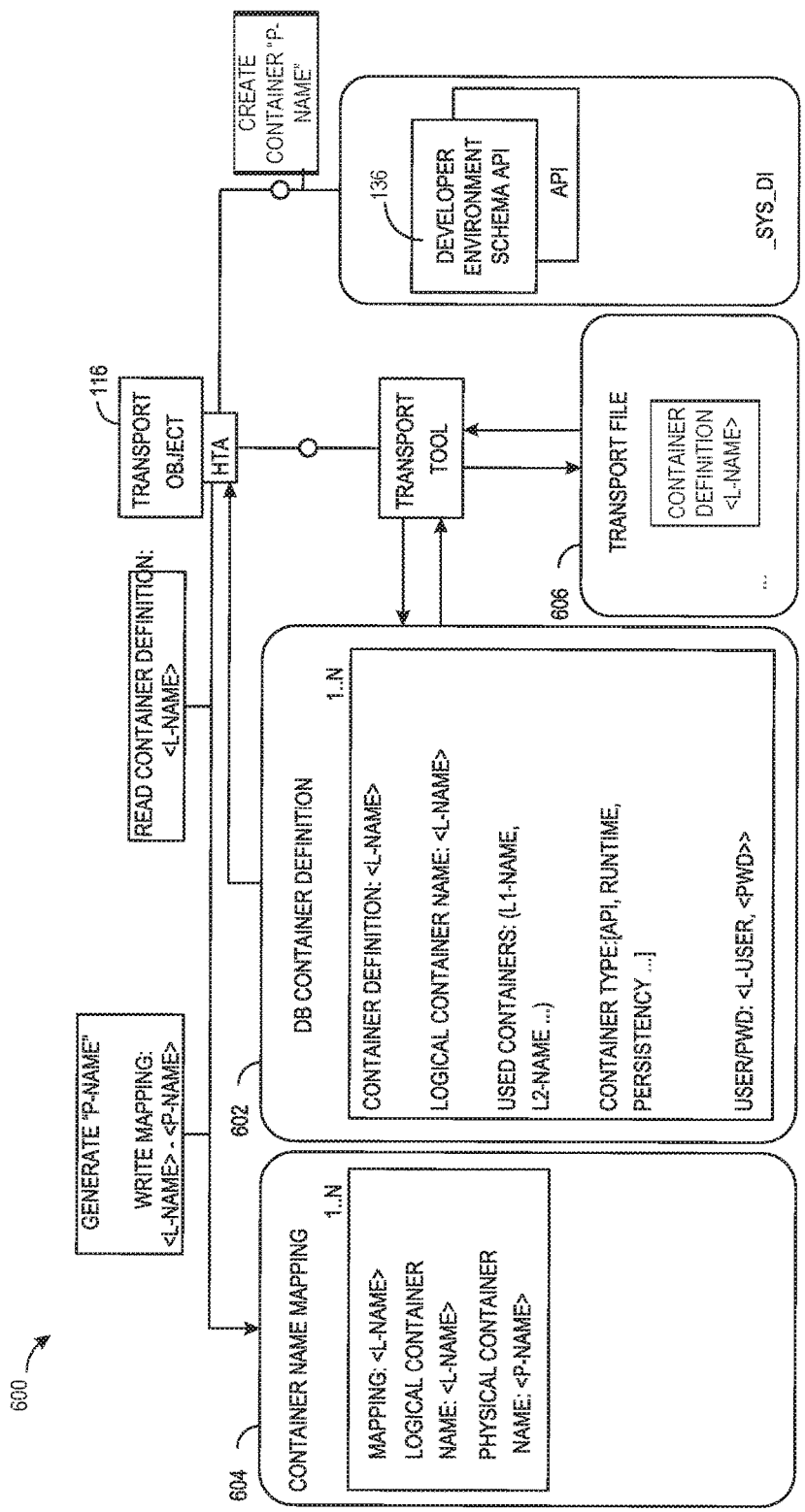
FIG. 6 is a block diagram illustrating operation of a container delivery infrastructure (CDI), in accordance with an example embodiment.

FIG. 6 is a block diagram illustrating operation 600 of the CDI 202, in accordance with an example embodiment. When the transport object 116 creates the container using the schema, causing creation of one or more schemas in the database, a container definition 602 is first read, and a container name is generated. This container name is written into a container name mapping 604 between a logical container name (here, "l-name") and the physical container name (here, "p-name"). The physical container name is used by the developer environment schema API 136 to create the container itself, but the transport tool utilizes a transport file 606 that utilizes the logical container name. Later, at activation time, the physical container name is determined using the defined logical container name in the transport file 606 and resolving the logical container name to the physical container name using the container name mapping 604.

Figure 7:
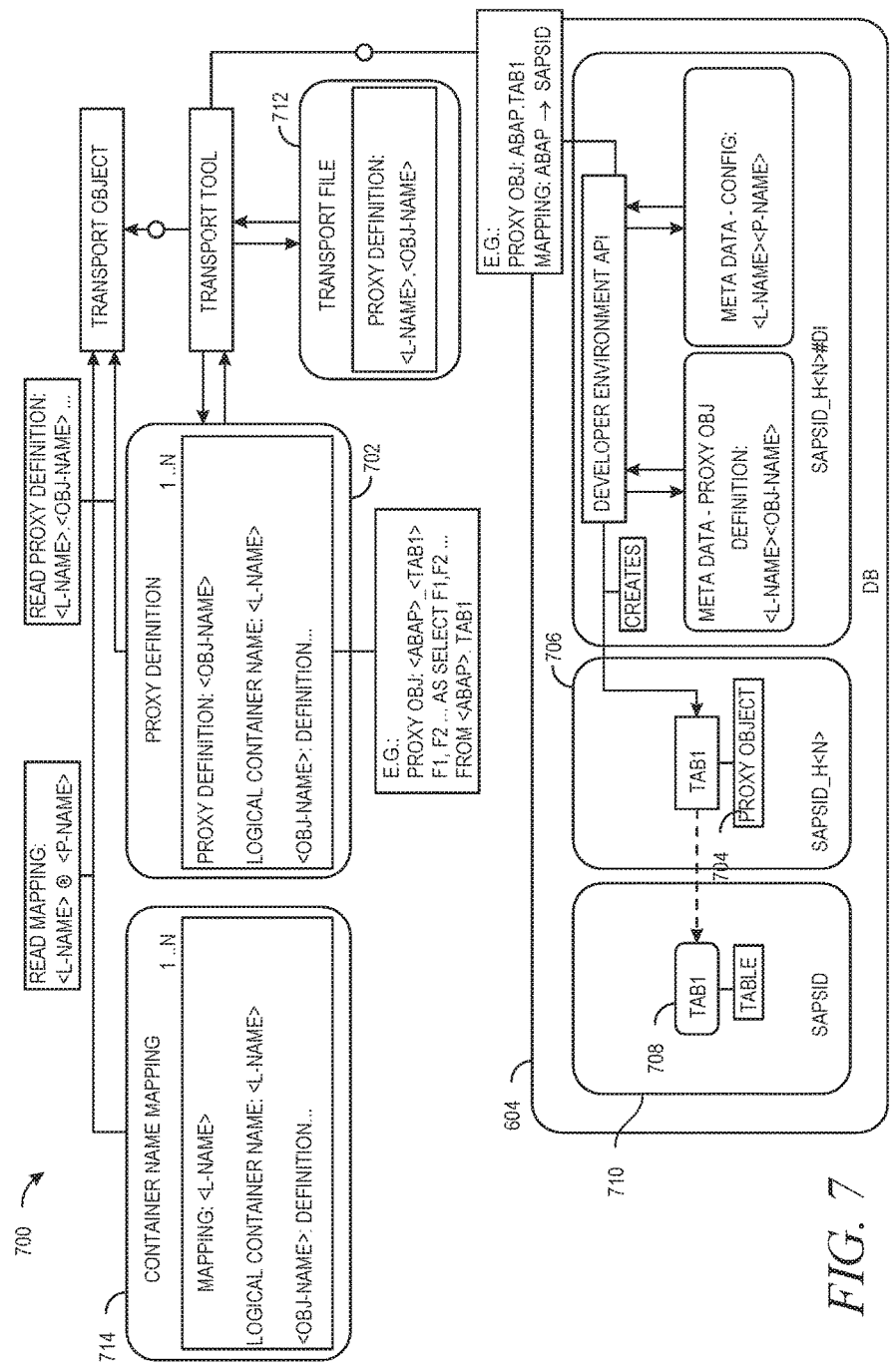
FIG. 7 is a block diagram illustrating operation of a proxy delivery infrastructure (PODI), in accordance with an example embodiment.

FIG. 7 is a block diagram illustrating operation 700 of the PODI 204, in accordance with an example embodiment. Here, the developer is able to create a proxy definition 702 (corresponding to a proxy object 704 in a first logical schema 706) that itself references an object 708 to another logical schema 710. The PODI 204 verifies that these containers are only referenced unidirectionally during deployment, so that a cycle-free dependency graph can be computed. As with the CDI 202, at activation time, the physical container name is determined by using the defined logical container name in a transport file 712 and resolving the logical container name to the physical container name using a container name mapping 714.

Figure 8:
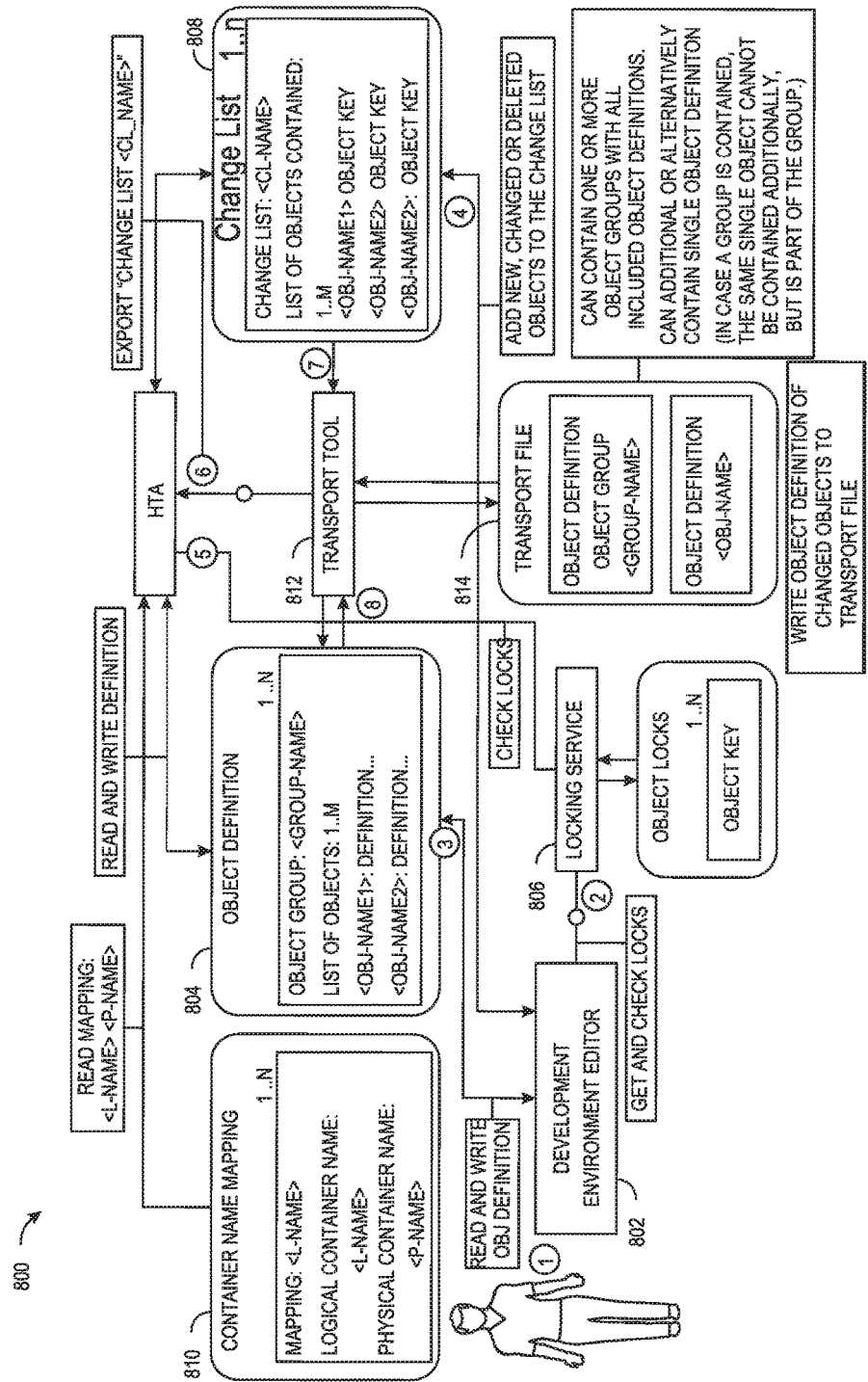
FIG. 8 is a block diagram illustrating operation of an object delivery infrastructure (ODI), in accordance with an example embodiment.

FIG. 8 is a block diagram illustrating operation 800 of the ODI 206, in accordance with an example embodiment. A development environment editor 802 reads and writes object definitions 804. A locking service 806 gets and checks locks on data. When the development environment editor 802 writes an object definition 804, the locks are checked. Then new, changed, or deleted objects are added to a change list 808. The ODI 206 then accesses a container name mapping 810, reads the object definition 804, and exports the change list 808 to a transport tool 812. The transport tool 812 then outputs a transport file 814 by writing the object definitions of changed objects to the transport file 814, which can contain one or more object groups with all included object definitions. The transport file 814 can additionally or alternatively contain single object definitions.

Figure 9:
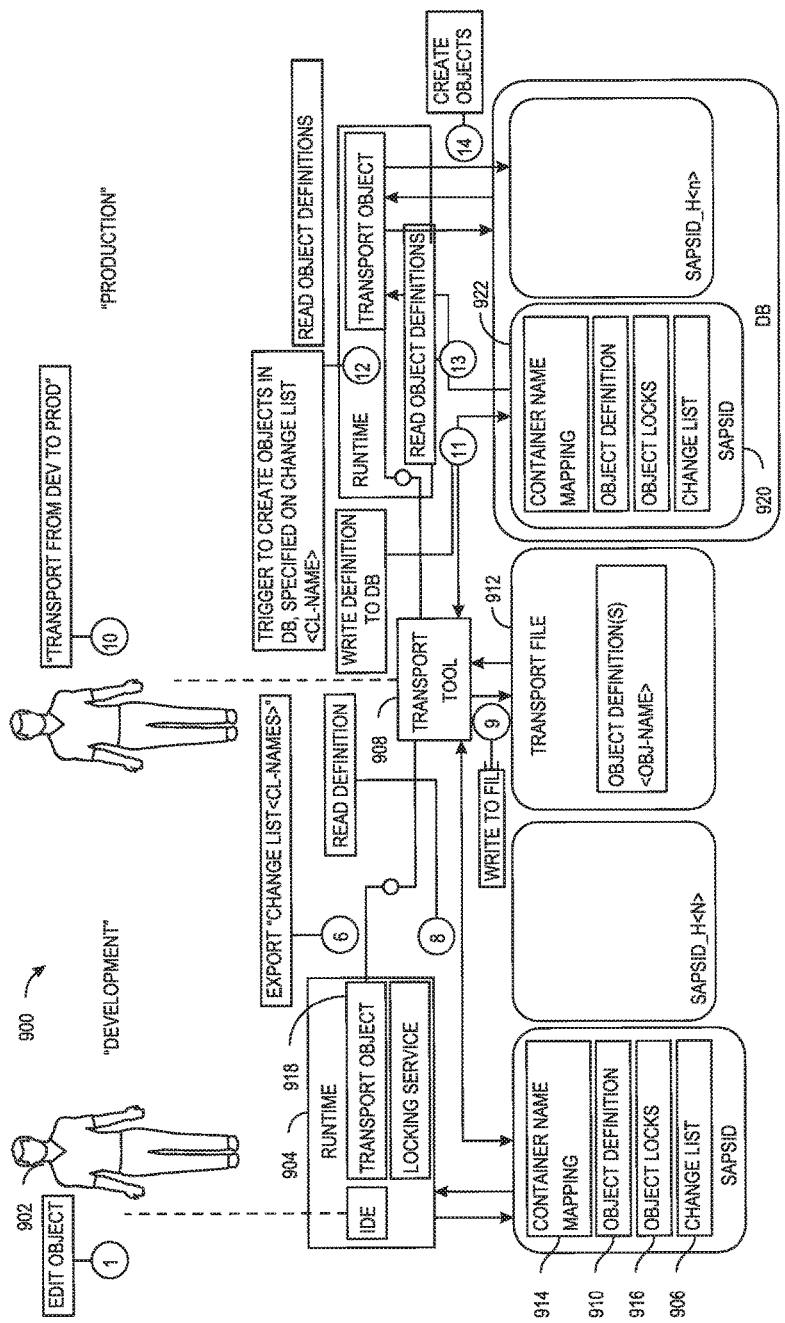
FIG. 9 is a block diagram illustrating a development and production lifecycle of database objects, utilizing an ODI, in accordance with an example embodiment.

FIG. 9 is a block diagram illustrating a development and production lifecycle 900 of database objects, utilizing the ODI 206, in accordance with an example embodiment. A developer 902 edits an object in a runtime 904, which, as described above with respect to FIG. 8, causes a change list 906 to be exported. A transport tool 908 then reads an object definition 910 from the database and writes the object definition 910 to a transport file 912. At this point, "development" may change to "production", which causes the transport tool 908 to deploy a container name mapping 914, the object definition 910, object locks 916, and the change list 906 to the database. Individual objects are then triggered to be created in the database, as specified in the change list 906. A transport object 918 reads the object definitions 910 of those triggered objects from the database and creates corresponding objects 920 in a first schema 922.

Figure 10:
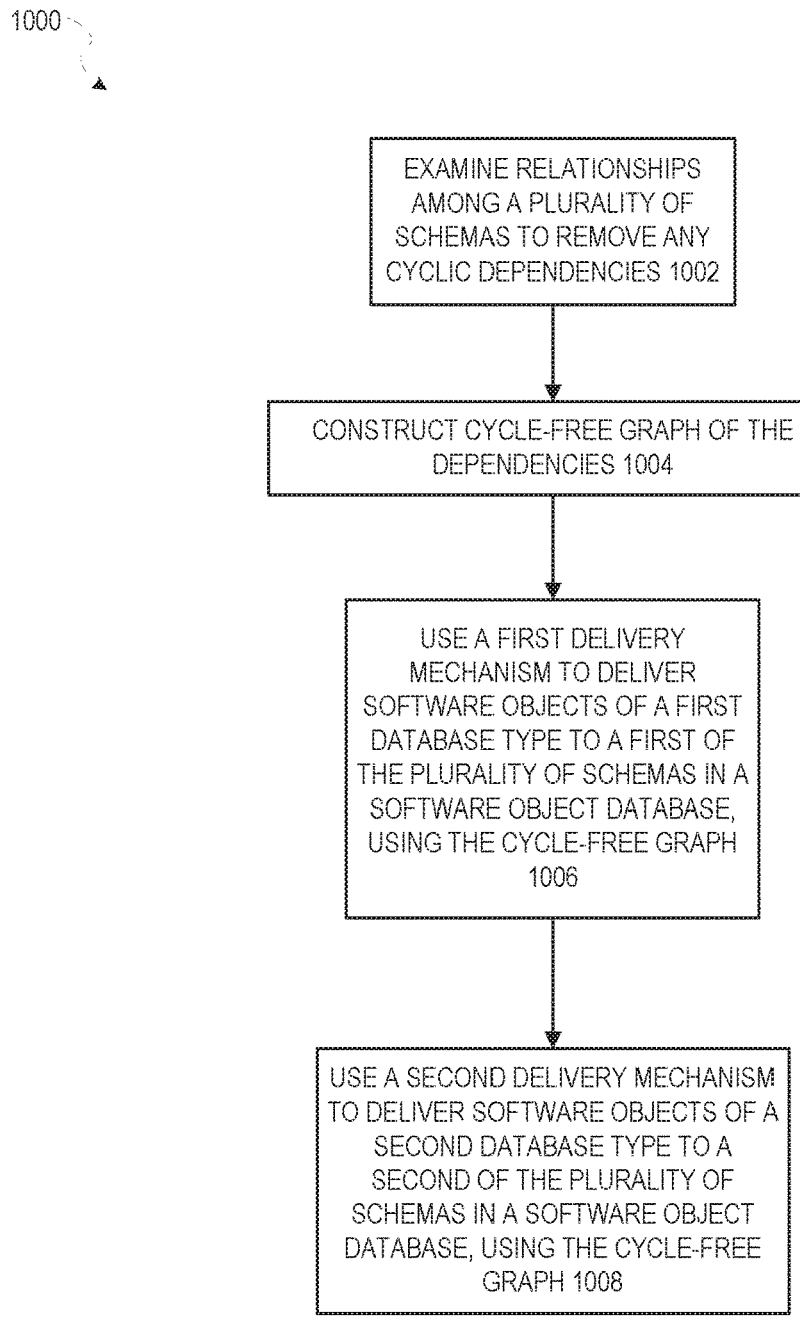
FIG. 10 is a flow diagram illustrating a method of object management, in accordance with an example embodiment.

FIG. 10 is a flow diagram illustrating a method 1000 of object management, in accordance with an example embodiment. At operation 1002, relationships among a plurality of schemas are examined to remove any cyclic dependencies. At operation 1004, a cycle-free graph of the dependencies is constructed. At operation 1006, a first delivery mechanism is used to deliver software objects of a first database type to a first of the plurality of schemas in a software object database, using the cycle-free graph. At operation 1008, a second delivery mechanism is used to deliver software objects of a second database type to a second of the plurality of schemas in the software object database, using the cycle-free graph.

Figure 11:
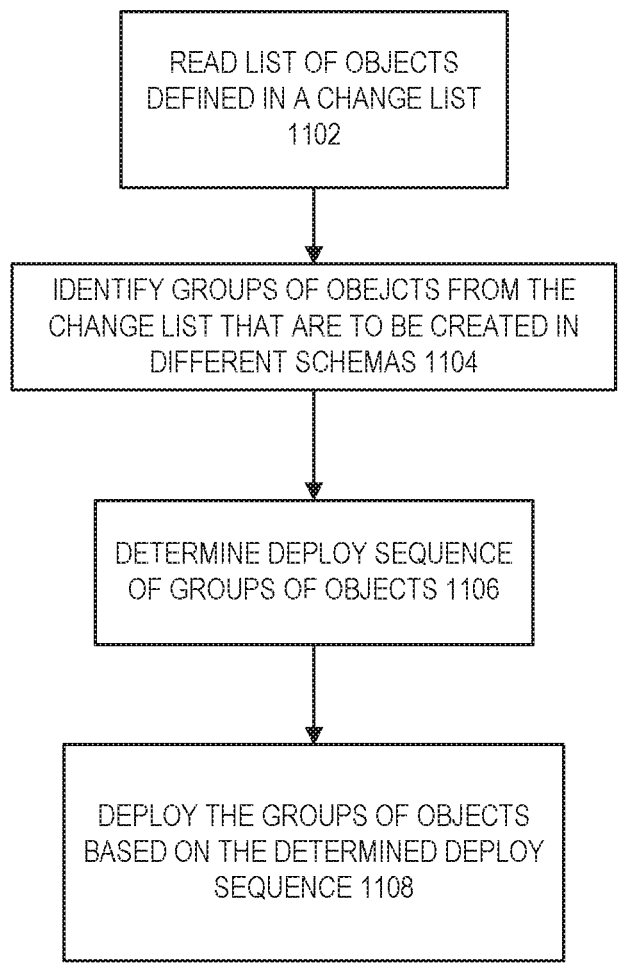
FIG. 11 is a flow diagram illustrating a method of deploying objects, in accordance with an example embodiment.

FIG. 11 is a flow diagram illustrating a method 1100 of deploying objects, in accordance with an example embodiment. In an example embodiment, the method 1100 may be executed as part of both operations 1006 and 1008 in FIG. 10.

At operation 1102, a list of objects defined in a change list is read. At operation 1104, groups of objects are identified from the change list that are to be created in different schemas. At operation 1106, a deploy sequence of the groups of objects is determined. At operation 1108, the groups of objects are deployed based on the determined deploy sequence.

Figure 12:
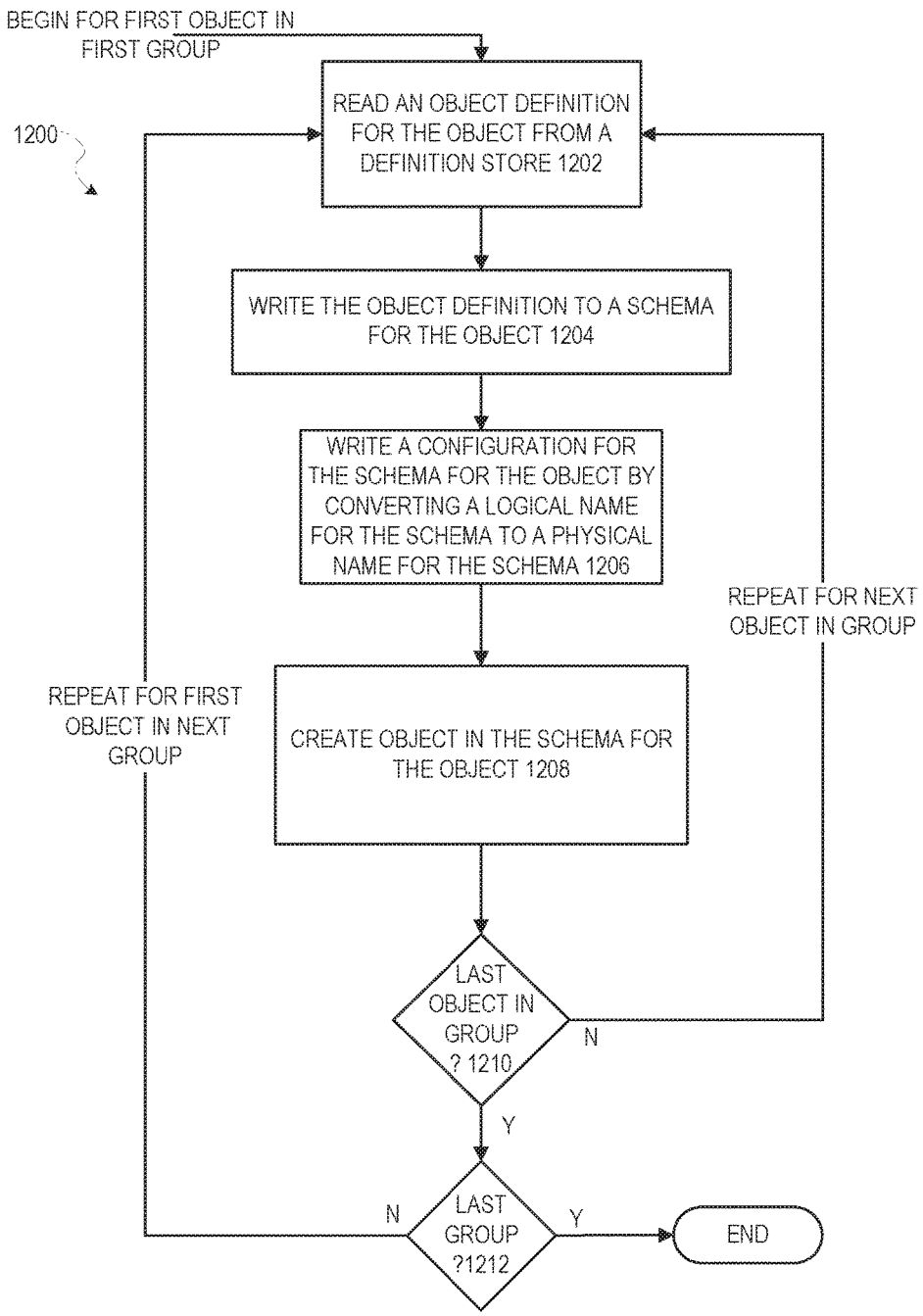
FIG. 12 is a flow diagram illustrating a method of deploying groups of objects, in accordance with an example embodiment.

FIG. 12 is a flow diagram illustrating a method 1200 of deploying groups of objects, in accordance with an example embodiment. In an example embodiment, the method 1200 may be executed as part of operation 1108 of FIG. 11.

A loop is began for each object in each group of objects. At operation 1202, an object definition for the object is read from a definition store. At operation 1204, the object definition is written to a schema for the object. At operation 1206, a configuration is written to the schema for the object by converting a logical name for the schema to a physical name for the schema. At operation 1208, the object is created in the schema for the object. At operation 1210, it is determined if this is the last object in the group. If not, then the method 1200 loops back to operation 1202 for the next object in the group. If so, then at operation 1212 it is determined if this is the last group. If not, then the method 1200 loops back to operation 1202 for the first object in the next group. If so, then the method 1200 ends.

Figure 13:
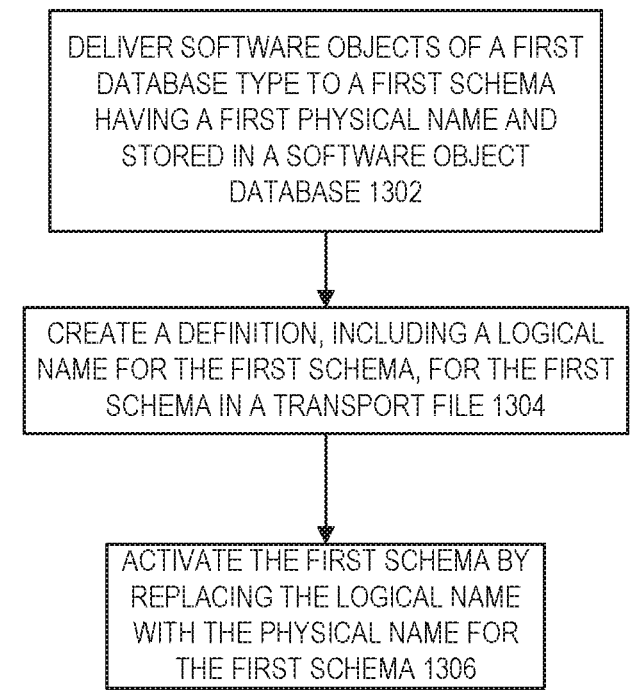
FIG. 13 is a flow diagram illustrating a method of schema delivery, in accordance with an example embodiment.

FIG. 13 is a flow diagram illustrating a method 1300 of schema delivery, in accordance with an example embodiment. At operation 1302, software objects of a first database type are delivered to a first schema having a first physical name and stored in a software object database. At operation 1304, a definition for the first schema is created in a transport file, the definition of the first schema in the transport file including a logical name for the first schema. At operation 1306, at a time subsequent to the first schema being delivered to the software object database, the first schema is activated by replacing the logical name for the first schema stored in the definition in the transport file with the physical name for the first schema.

Figure 14:
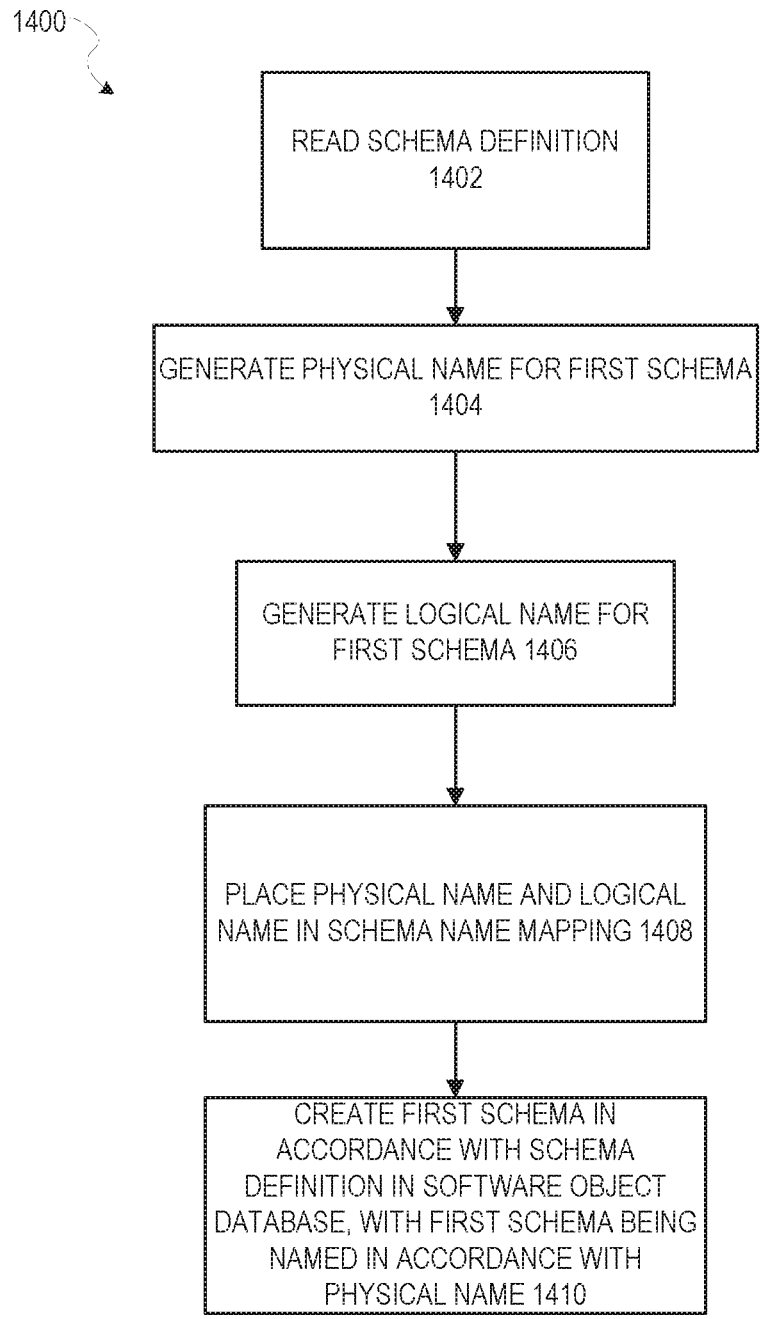
FIG. 14 is a flow diagram illustrating a method of delivering software objects of a first database type to a first schema, in accordance with an example embodiment.

FIG. 14 is a flow diagram illustrating a method 1400 of delivering software objects of a first database type to a first schema, in accordance with an example embodiment. In an example embodiment, the method 1400 may be implemented as part of operation 1302 in FIG. 13.

At operation 1402, a schema definition is read. At operation 1404, a physical name for the first schema is generated. At operation 1406, a logical name for the first schema is generated. At operation 1408, the physical name and the logical name for the first schema are placed in a schema name mapping. At operation 1410, the first schema is created in accordance with the schema definition in the software object database, with the first schema being named in accordance with the physical name in the software object database. In some example embodiments, a copy of the schema definition with the logical name is placed in a transport file.

Figure 15:
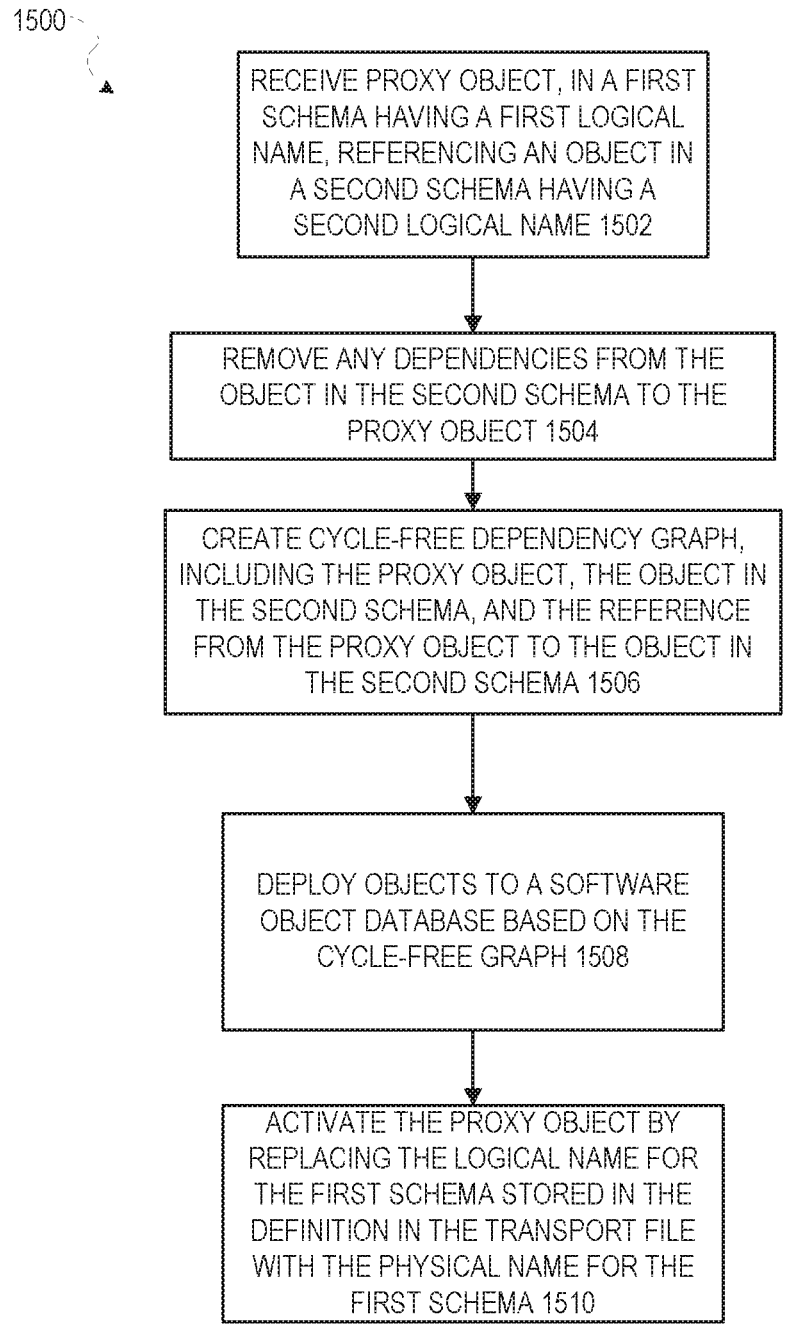
FIG. 15 is a flow diagram illustrating a method of delivering a proxy object, in accordance with an example embodiment.

FIG. 15 is a flow diagram illustrating a method 1500 of delivering a proxy object, in accordance with an example embodiment. At operation 1502, a proxy object, in a first schema having a first logical name, referencing an object in a second schema having a second logical name, is received. At operation 1504, any dependencies of the object in the second schema on the proxy object are removed. At operation 1506, a cycle-free dependency graph is created, including the proxy object, the object in the second schema, and the reference from the proxy object to the object in the second schema. At operation 1508, objects are deployed to a software object database based on the cycle-free graph. At operation 1510, at a time subsequent to the first schema being delivered to the software object database, the proxy object is activated by replacing the logical name for the first schema stored in the definition in the transport file with the physical name for the first schema.

Figure 16:
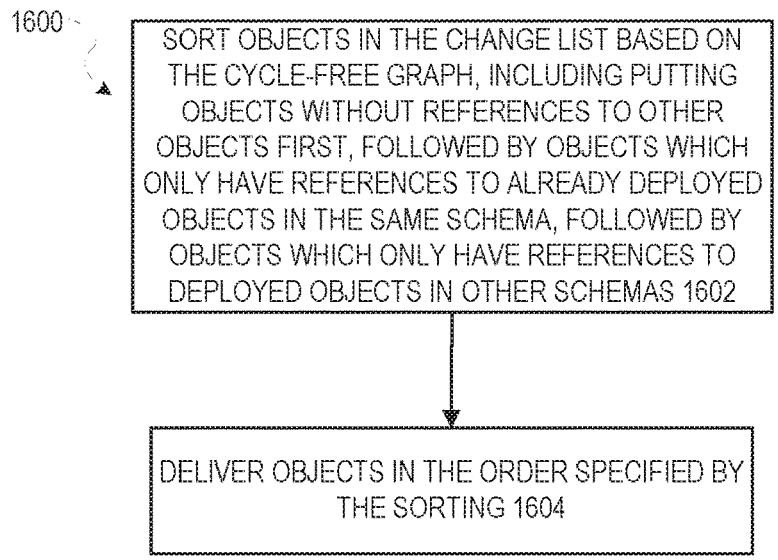
FIG. 16 is a flow diagram illustrating a method of delivering objects based on a cycle-free graph, in accordance with an example embodiment.

FIG. 16 is a flow diagram illustrating a method 1600 of delivering objects based on a cycle-free graph, in accordance with an example embodiment. In an example embodiment, the method 1600 is implemented as part of operation 1508 of FIG. 15.

At operation 1602, objects in the change list are sorted based on the cycle-free graph, the sorting including putting objects without references to other objects first, followed by objects which only have references to already deployed objects in the same schema, followed by objects which only have references to deployed objects in other schemas. At operation 1604, objects are delivered in the order specified by the sorting. Notably, objects having references to undeployed objects in other schemas are not deployed at this time.

Figure 17:
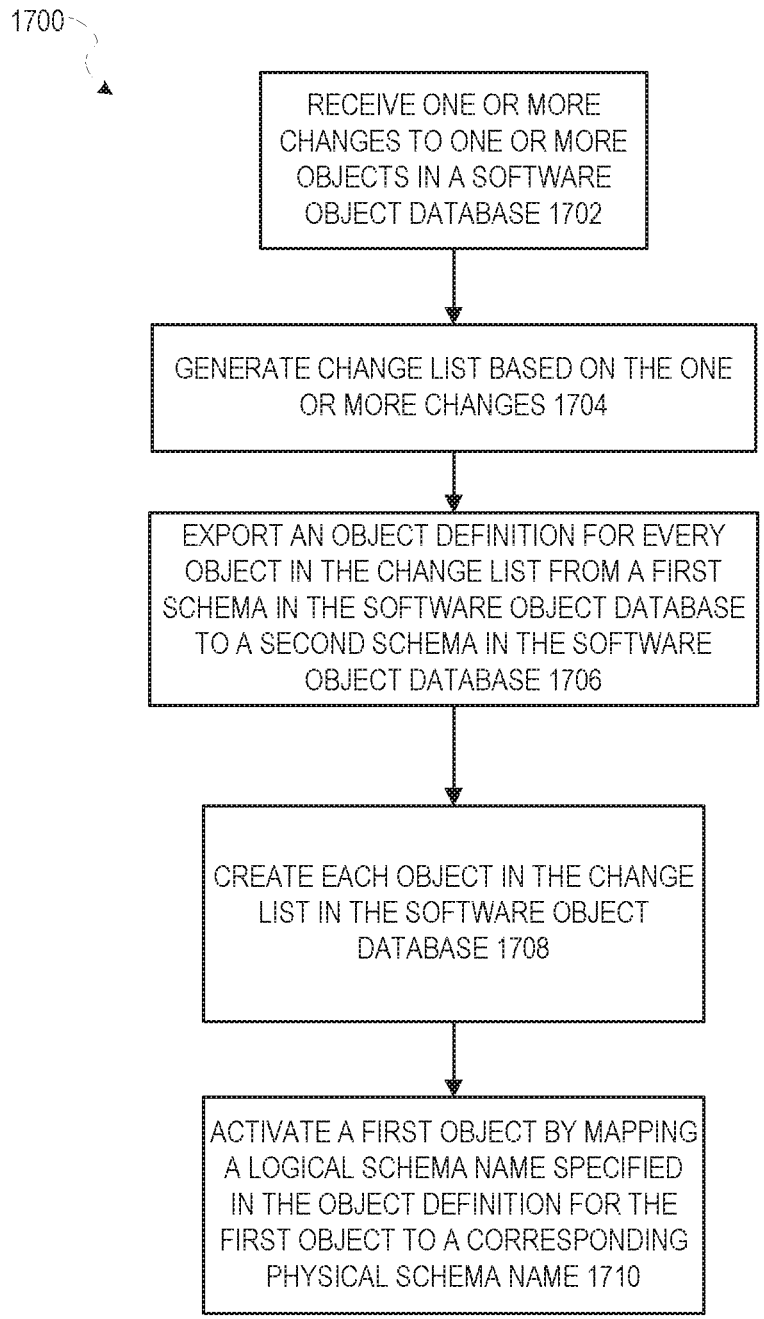
FIG. 17 is a flow diagram illustrating a method of delivering database objects, in accordance with an example embodiment.

FIG. 17 is a flow diagram illustrating a method 1700 of delivering database objects, in accordance with an example embodiment. At operation 1702, one or more changes to one or more objects in a software object database are received from a developer. At operation 1704, a change list is generated based on the one or more changes. At operation 1706, an object definition for every object in the change list is exported from a first schema in the software object database to a second schema in the software object database. At operation 1708, each object in the change list is created in the software object database. At operation 1710, the first object is activated by mapping a logical schema name specified in the object definition for the first object to a corresponding physical schema name.

EXAMPLES

Example 1

A cloud-based software development management system comprising:
a software object database;
an application programming runtime comprising:
an orchestration infrastructure comprising:
a first delivery mechanism, the first delivery mechanism executable by one or more processors and configured to deliver software objects of a first database type to a first schema stored in the software object database; and
a second delivery mechanism, the second delivery mechanism configured to deliver software objects of a second database type to a second schema stored in the software object database;
the orchestration infrastructure limiting dependencies between the first schema and the second schema in software objects stored in the software object database such that no cyclic dependencies are present; and
the orchestration infrastructure further computing a cycle-free graph of dependencies among each of a plurality of schemas in the software object database and deploying software objects based on the cycle-free graph.

Example 2

The cloud-based software development management system of Example 1, wherein the deploying includes:
 reading a list of objects defined in a change list;
 identifying groups of objects from the change list that are to be created in different schemas;
 determining a deploy sequence of the groups of objects; and
 deploying the groups of objects based on the determined deploy sequence.

Example 3

The cloud-based software development management system of Example 2, wherein the deploying the groups of objects based on the determined deploy sequence includes, for each object in each group of objects:
 reading an object definition for the object from a definition store;
 writing the object definition to a schema for the object;
 writing a configuration to the schema for the object by converting a logical name for the schema to a physical name for the schema; and
 creating the object in the schema for the object.

Example 4

The cloud-based software development management system of Examples 2 or 3, wherein the deploy sequence places objects that reference objects in other schemas first.

Example 5

The cloud-based software development management system of any of Examples 1-4, wherein the first schema is a relational database schema.

Example 6

The cloud-based software development management system of any of Examples 1-5, wherein the second schema is an in-memory database schema.

Example 7

The cloud-based software development management system of any of Examples 1-6, wherein the software objects include database views and/or synonyms.

Example 8

A method comprising:
 examining relationships among a plurality of schemas to remove any cyclic dependencies;
 constructing a cycle-free graph of the dependencies;
 using a first delivery mechanism to deliver software objects of a first database type to a first of the plurality of schemas in a software object database, using the cycle-free graph; and
 using a second delivery mechanism to deliver software objects of a second database type to a second of the plurality of schemas in the software object database, using the cycle-free graph.

Example 9

The method of Example 8, wherein the deploying includes:
 reading a list of objects defined in a change list;
 identifying groups of objects from the change list that are to be created in different schemas;
 determining a deploy sequence of the groups of objects; and
 deploying the groups of objects based on the determined deploy sequence.

Example 10

The method of Example 9, wherein the deploying the groups of objects based on the determined deploy sequence includes, for each object in each group of objects:
 reading an object definition for the object from a definition store;
 writing the object definition to a schema for the object;
 writing a configuration to the schema for the object by converting a logical name for the schema to a physical name for the schema; and
 creating the object in the schema for the object.

Example 11

The method of Examples 9 or 10, wherein the deploy sequence places objects that reference objects in other schemas first.

Example 12

The method of any of Examples 8-11, wherein the first schema is a relational database schema.

Example 13

The method of any of Examples 8-12, wherein the second schema is an in-memory database schema.

Example 14

The method of any of Examples 8-13, wherein the software objects include database views and/or synonyms.

Example 15

A non-transitory machine-readable storage medium comprising instructions, which when implemented by one or more machines, cause the one or more machines to perform operations comprising:
 examining relationships among a plurality of schemas to remove any cyclic dependencies;
 constructing a cycle-free graph of the dependencies;
 using a first delivery mechanism to deliver software objects of a first database type to a first of the plurality of schemas in a software object database, using the cycle-free graph; and
 using a second delivery mechanism to deliver software objects of a second database type to a second of the plurality of schemas in the software object database, using the cycle-free graph.

Example 16

The non-transitory machine-readable storage medium of Example 15, wherein the deploying includes:

reading a list of objects defined in a change list;
identifying groups of objects from the change list that are to be created in different schemas;
determining a deploy sequence of the groups of objects; and
deploying the groups of objects based on the determined deploy sequence.

Example 17

The non-transitory machine-readable storage medium of Example 16, wherein the deploying the groups of objects based on the determined deploy sequence includes, for each object in each group of objects:
reading an object definition for the object from a definition store;
writing the object definition to a schema for the object;
writing a configuration to the schema for the object by converting a logical name for the schema to a physical name for the schema; and
creating the object in the schema for the object.

Example 18

The non-transitory machine-readable storage medium of Examples 16 or 17, wherein the deploy sequence places objects that reference objects in other schemas first.

Example 19

The non-transitory machine-readable storage medium of any of Examples 15-18, wherein the first schema is a relational database schema.

Example 20

The non-transitory machine-readable storage medium of any of Examples 15-19, wherein the second schema is an in-memory database schema.

Modules, Components, and Logic

Certain embodiments are described herein as including logic or a number of components, modules, or mechanisms. Modules may constitute either software modules (e.g., code embodied on a machine-readable medium) hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-17 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "interact of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 18:
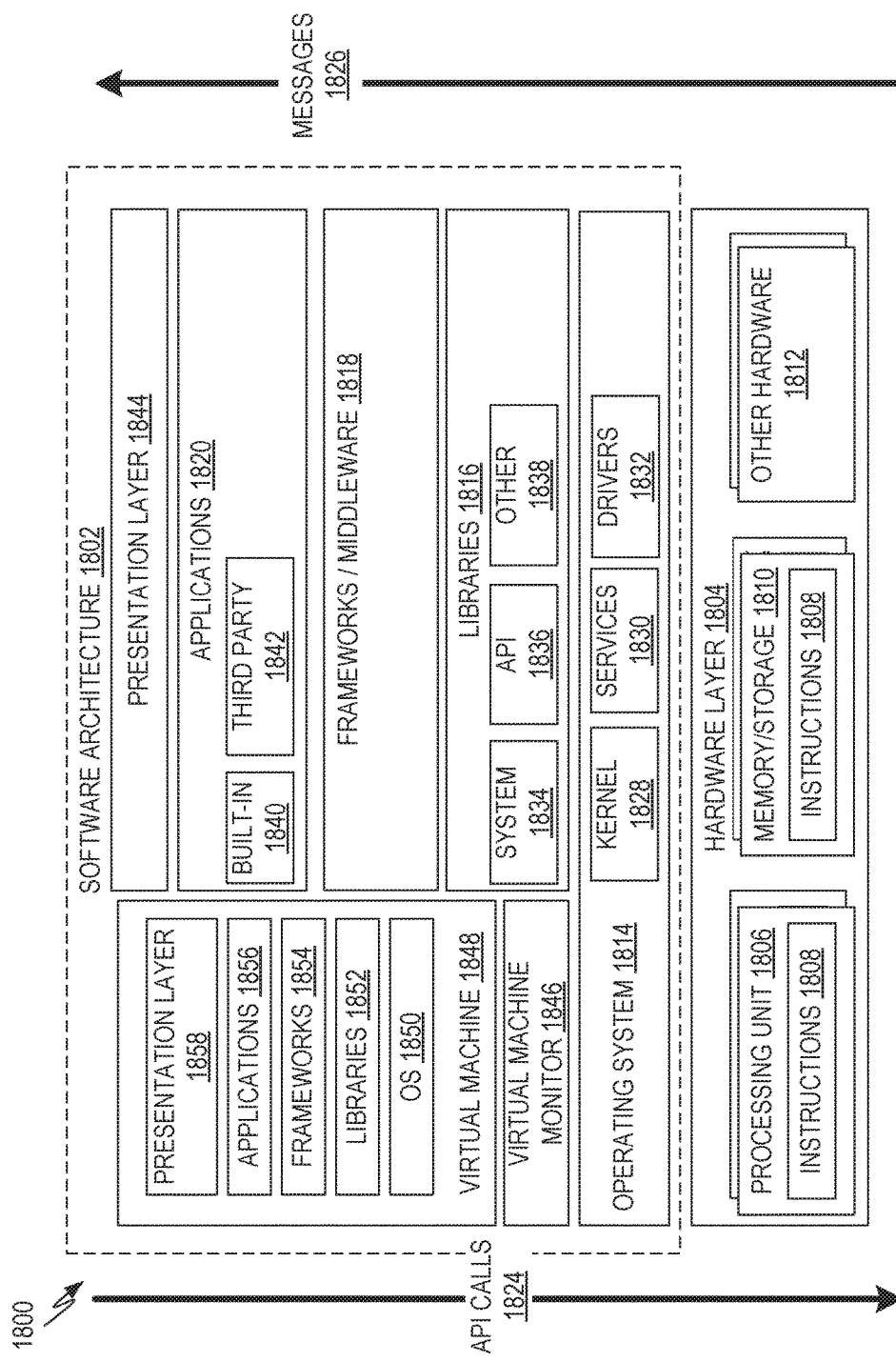
FIG. 18 is a block diagram illustrating a representative software architecture, according to some example embodiments, which may be used in conjunction with various hardware architectures herein described.

FIG. 18 is a block diagram 1800 illustrating a representative software architecture 1802, which may be used in conjunction with various hardware architectures herein described. FIG. 18 is merely a non-limiting example of a software architecture, and it will be appreciated that many other architectures may be implemented to facilitate the functionality described herein. The software architecture 1802 may be executing on hardware such as a machine 1900 of FIG. 19 that includes, among other things, processors 1910, memory/storage 1930, and I/O components 1950. A representative hardware layer 1804 is illustrated and can represent, for example, the machine 1900 of FIG. 19. The representative hardware layer 1804 comprises one or more processing units 1806 having associated executable instructions 1808. The executable instructions 1808 represent the executable instructions of the software architecture 1802, including implementation of the methods, modules, and so forth of FIGS. 1-17. The hardware layer 1804 also includes memory and/or storage modules 1810, which also have the executable instructions 1808. The hardware layer 1804 may also comprise other hardware 1812, which represents any other hardware of the hardware layer 1804, such as the other hardware illustrated as part of the machine 1900.

In the example architecture of FIG. 18, the software architecture 1802 may be conceptualized as a stack of layers where each layer provides particular functionality. For example, the software architecture 1802 may include layers such as an operating system 1814, libraries 1816, frameworks/middleware 1818, applications 1820, and a presentation layer 1844. Operationally, the applications 1820 and/or other components within the layers may invoke API calls 1824 through the software stack and receive responses, returned values, and so forth, illustrated as messages 1826, in response to the API calls 1824. The layers illustrated are representative in nature and not all software architectures have all layers. For example, some mobile or special-purpose operating systems may not provide a layer of frameworks/middleware 1818, while others may provide such a layer. Other software architectures may include additional or different layers.

The operating system 1814 may manage hardware resources and provide common services. The operating system 1814 may include, for example, a kernel 1828, services 1830, and drivers 1832. The kernel 1828 may act as an abstraction layer between the hardware and the other software layers. For example, the kernel 1828 may be responsible for memory management, processor management (e.g., scheduling), component management, networking, security settings, and so on. The services 1830 may provide other common services for the other software layers. The drivers 1832 may be responsible for controlling or interfacing with the underlying hardware. For instance, the drivers 1832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1816 may provide a common infrastructure that may be utilized by the applications 1820 and/or other components and/or layers. The libraries 1816 typically provide functionality that allows other software modules to perform tasks in an easier fashion than by interfacing directly with the underlying operating system 1814 functionality (e.g., kernel 1828, services 1830, and/or drivers 1832). The libraries 1816 may include system libraries 1834 (e.g., C standard library) that may provide functions such as memory allocation functions, string manipulation functions, mathematic functions, and the like. In addition, the libraries 1816 may include API libraries 1836 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1816 may also include a wide variety of other libraries 1838 to provide many other APIs to the applications 1820 and other software components/modules.

The frameworks 1818 (sometimes referred to as middleware) may provide a higher-level common infrastructure that may be utilized by the applications 1820 and/or other software components/modules. For example, the frameworks 1818 may provide various graphic user interface (GUI) functions, high-level resource management, high-level location services, and so forth The frameworks 1818 may provide a broad spectrum of other APIs that may be utilized by the applications 1820 and/or other software components/modules, some of which may be specific to a particular operating system or platform.

The applications 1820 include built-in applications 1840 and/or third-party applications 1842. Examples of representative built-in applications 1840 may include, but are not limited to, a contacts application, a browser application, a book reader application, a location application, a media application, a messaging application, and/or a game application. The third-party applications 1842 may include any of the built-in applications 1840 as well as a broad assortment of other applications. In a specific example, the third-party application 1842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1842 may invoke the API calls 1824 provided by the mobile operating system such as the operating system 1814 to facilitate functionality described herein.

The applications 1820 may utilize built-in operating system 1814 functions (e.g., kernel 1828, services 1830, and/or drivers 1832), libraries 1816 (e.g., system libraries 1834, API libraries 1836, and other libraries 1838), and frameworks/middleware 1818 to create user interfaces to interact with users of the system. Alternatively, or additionally, in some systems, interactions with a user may occur through a presentation layer, such as the presentation layer 1844. In these systems, the application/module "logic" can be separated from the aspects of the application/module that interact with a user.

Some software architectures utilize virtual machines. In the example of FIG. 18, this is illustrated by a virtual machine 1848. A virtual machine creates a software environment where applications/modules can execute as if they were executing on a hardware machine (such as the machine 1900 of FIG. 19, for example). A virtual machine is hosted by a host operating system (e.g., operating system 1814 in FIG. 18) and typically, although not always, has a virtual machine monitor 1846, which manages the operation of the virtual machine 1848 as well as the interface with the host operating system (e.g., operating system 1814). A software architecture executes within the virtual machine 1848, such as an operating system 1850, libraries 1852, frameworks/middleware 1854, applications 1856, and/or a presentation layer 1858. These layers of software architecture executing within the virtual machine 1848 can be the same as corresponding layers previously described or may be different.

Example Machine Architecture And Machine-Readable Medium

Figure 19:
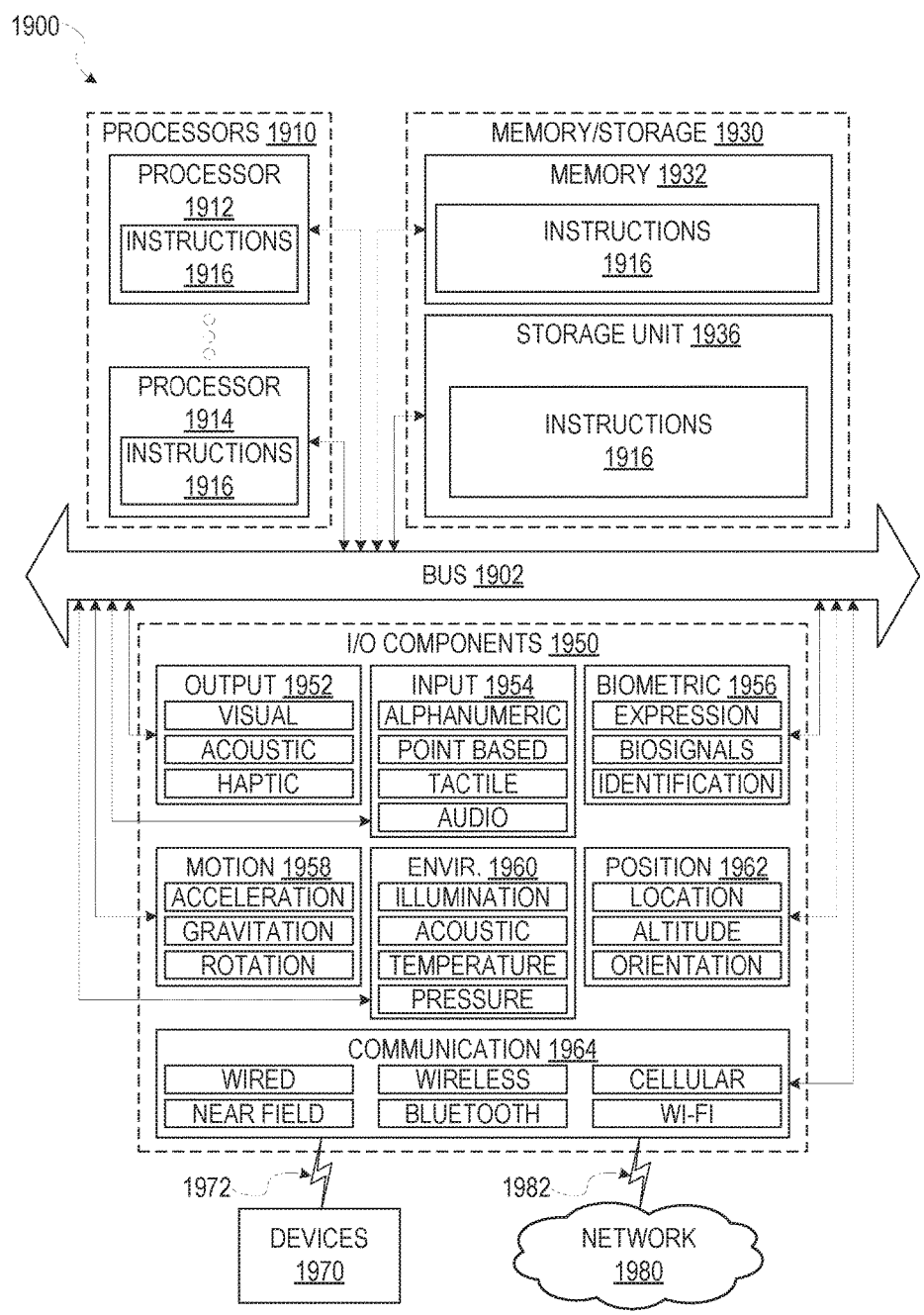
FIG. 19 is a block diagram illustrating components of a machine, according to some example embodiments, able to read instructions from a machine-readable medium e.g., a machine-readable storage medium) and perform any one or more of the methodologies discussed herein.

FIG. 19 is a block diagram illustrating components of a machine 1900, according to some example embodiments, able to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1916 software, a program, an application, an applet, an app, or other executable code) for causing the machine 1900 to perform any one or more of the methodologies discussed herein may be executed. The instructions 1916 transform the general, non-programmed machine into a particular machine programmed to can out the described and illustrated functions in the manner described. In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines 1900 that individually or jointly execute the instructions 1916 to perform any one or more of the methodologies discussed herein.

The machine 1900 may include processors 1910, memory/storage 1930, and I/O components 1950, which may be configured to communicate with each other such as via a bus 1902. In an example embodiment, the processors 1910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1912 and a processor 1914 that may execute the instructions 1916. The term "processor" is intended to include multi-core processors that may comprise two or more independent processors (sometimes referred to as "cores") that may execute the instructions 1916 contemporaneously. Although FIG. 19 shows multiple processors 1910, the machine 1900 may include a single processor with a single core, a single processor with multiple cores (e.g., a multi-core processor), multiple processors with a single core, multiple processors with multiple cores, or any combination thereof.

The memory/storage 1930 may include a memory 1932, such as a main memory, or other memory storage, and a storage unit 1936, both accessible to the processors 1910 such as via the bus 1902. The storage unit 1936 and memory 1932 store the instructions 1916 embodying any one or more of the methodologies or functions described herein. The instructions 1916 may also reside, completely or partially, within the memory 1932, within the storage unit 1936, within at least one of the processors 1910 (e.g., within the processor's cache memory), or any suitable combination thereof, during execution thereof by the machine 1900. Accordingly, the memory 1932, the storage unit 1936, and the memory of the processors 1910 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media. (e.g., a centralized or distributed database, or associated caches and servers) able to store the instructions 1916. The term "machine-readable medium" shall also be taken to include any medium, or combination of multiple media, that is capable of storing instructions (e.g., instructions 1916) for execution by a machine (e.g., machine 1900), such that the instructions, when executed by one or more processors of the machine (e.g., processors 1910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1950 may include a wide variety of components to receive input, provide output, produce output, transmit information, exchange information, capture measurements, and so on. The specific I/O components 1950 that are included in a particular machine will depend on the type of machine. For example, portable machines such as mobile phones will likely include a touch input device or other such input mechanisms, while a headless server machine will likely not include such a touch input device. It will be appreciated that the I/O components 1950 may include many other components that are not shown in FIG. 19. The I/O components 1950 are grouped according to functionality merely for simplifying the following discussion and the grouping is in no way limiting. In various example embodiments, the I/O components 1950 may include output components 1952 and input components 1954. The output components 1952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1950 may include biometric components 1956, motion components 1958, environmental components 1960, or position components 1962, among a wide array of other components. For example, the biometric components 1956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1958 may include acceleration sensor components (e.g., accelerometer), gravitation sensor components, rotation sensor components (e.g., gyroscope), and so forth. The environmental components 1960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1950 may include communication components 1964 operable to couple the machine 1900 to a network 1980 or devices 1970 via a coupling 1982 and a coupling 1972, respectively. For example, the communication components 1964 may include a network interface component or other suitable device to interface with the network 1980. In further examples, the communication components 1964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1970 may be another machine or any of a wide variety of peripheral devices (e.g., a peripheral device coupled via a USB).

Moreover, the communication components 1964 may detect identifiers or include components operable to detect identifiers. For example, the communication components 1964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1980 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1980 or a portion of the network 1980 may include a wireless or cellular network and the coupling 1982 may be a Code Division Multiple Access (CDMA) connection, a Global System for Mobile communications (GSM) connection, or another type of cellular or wireless coupling. In this example, the coupling 1982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1916 may be transmitted or received over the network 1980 using a transmission medium via a network interface device (e.g., a network interface component included in the communication components 1964) and utilizing any one of a number of well-known transfer protocols (e.g., HTTP). Similarly, the instructions 1916 may be transmitted or received using a transmission medium via the coupling 1972 (e.g., a peer-to-peer coupling) to the devices 1970. The term "transmission medium" shall be taken to include any intangible medium that is capable of storing, encoding, or carrying the instructions 1916 for execution by the machine 1900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A non-transitory machine-readable storage medium comprising instructions which, when implemented by one or more machines, cause the one or more machines to perform operations comprising:

examining relationships among a plurality of database schemas to identify cross-schema dependencies, each cross-schema dependency being a dependency between two different database schemas;

constructing a cycle-free graph of the schema dependencies, removing any cyclic dependencies by eliminating any dependency from a first schema to a second schema if a dependency from the second schema to the first schema already exists in the cycle-free graph;

using a first delivery mechanism to deliver software objects of a first database type to a first of the plurality of schemas in a software object database, by traversing the cycle-free graph and delivering to the first of the plurality of schemas any software objects, of the first database type, corresponding to a traversed node in the cycle-free graph;

using a second delivery mechanism to deliver software objects of a second database type to a second of the plurality of schemas in the software object database, by traversing the cycle-free graph and delivering to the second of the plurality of schemas any software object, of the second database type, corresponding to a traversed node in the cycle-free graph; using the cycle-free graph; and delaying deployment of any software objects of the first or second database type that do not correspond to a traversed node in the cycle-free graph until first use of the software objects of the first or second database type that do not correspond to a traversed node in the cycle-free graph.

2. The non-transitory machine-readable storage medium of claim 1, wherein the deploying includes:

reading a list of objects defined in a change list;

identifying groups of objects from the change list that are to be created in different schemas;

determining a deploy sequence of the groups of objects; and deploying the groups of objects based on the determined deploy sequence.

3. The non-transitory machine-readable storage medium of claim 2, wherein the deploying the groups of objects based on the determined deploy sequence includes, for each object in each group of objects:

reading an object definition for the object from a definition store;

writing the object definition to a schema for the object;

writing a configuration to the schema for the object by converting a logical name for the schema to a physical name for the schema; and creating the object in the schema for the object.

4. The non-transitory machine-readable storage medium of claim 2, wherein the deploy sequence places objects that reference objects in other schemas first.

5. The non-transitory machine-readable storage medium of claim 1, wherein the first schema is a relational database schema.

6. The non-transitory machine-readable storage medium of claim 1, wherein the second schema is an in-memory database schema.

7. The non-transitory machine-readable storage medium of claim 1, wherein the software objects include database views and/or synonyms.

8. A computerized method comprising:
examining relationships among a plurality of database schemas to identify cross-schema dependencies, each cross-schema dependency being a dependency between two different database schemas;
constructing a cycle-free graph of the schema dependencies, removing any cyclic dependencies by eliminating any dependency from a first schema to a second schema if a dependency from the second schema to the first schema already exists in the cycle-free graph;
using a first delivery mechanism to deliver software objects of a first database type to a first of the plurality of schemas in a software object database, by traversing the cycle-free graph and delivering to the first of the plurality of schemas any software object, of the first database type, corresponding to a traversed node in the cycle-free graph;
using a second delivery mechanism to deliver software objects of a second database type to a second of the plurality of schemas in the software object database, by traversing the cycle-free graph and delivering to the second of the plurality of schemas any software object, of the second database type, corresponding to a traversed node in the cycle-free graph;
using the cycle-free graph; and
delaying deployment of any software objects of the first or second database type that do not correspond to a traversed node in the cycle-free graph until first use of the software objects of the first or second database type that do not correspond to a traversed node in the cycle-free graph.

9. The method of claim 8, wherein the delivering includes:
reading a list of objects defined in a change list;
identifying groups of objects from the change list that are to be created in different schemas;
determining a deploy sequence of the groups of objects; and
deploying the groups of objects based on the determined deploy sequence.

10. The method of claim 9, wherein the deploying the groups of objects based on the determined deploy sequence includes, for each object in each group of objects:
reading an object definition for the object from a definition store;
writing the object definition to a schema for the object;
writing a configuration to the schema for the object by converting a logical name for the schema to a physical name for the schema; and
creating the object in the schema for the object.

11. The method of claim 9, wherein the deploy sequence places objects that reference objects in other schemas first.

12. The method of claim 8, wherein the first schema is a relational database schema.

13. The method of claim 8, wherein the second schema is an in-memory database schema.

14. The method of claim 8, wherein the software objects include database views and/or synonyms.

15. A non-transitory machine-readable storage medium comprising instructions, which when implemented by one or more machines, cause the one or more machines to perform operations comprising:
examining relationships among a plurality of database schemas to identify cross-schema dependencies, each cross-schema dependency being a dependency between two different database schemas;
constructing a cycle-free graph of the schema dependencies, removing any cyclic dependencies by eliminating any dependency from a first schema to a second schema if a dependency from the second schema to the first schema already exists in the cycle-free graph;
using a first delivery mechanism to deliver software objects of a first database type to a first of the plurality of schemas in a software object database, by traversing the cycle-free graph and delivering to the first of the plurality of schemas any software object, of the first database type, corresponding to a traversed node in the cycle-free graph;
using a second delivery mechanism to deliver software objects of a second database type to a second of the plurality of schemas in the software object database, by traversing the cycle-free graph and delivering to the second of the plurality of schemas any software object, of the second database type, corresponding to a traversed node in the cycle-free graph;
using the cycle-free graph; and
delaying deployment of any software objects of the first or second database type that do not correspond to a traversed node in the cycle-free graph until first use of that software objects of the first or second database type that do not correspond to a traversed node in the cycle-free graph
examining relationships among a plurality of database schemas to identify cross-schema dependencies, each cross-schema dependency being a dependency between two different database schemas;
constructing a cycle-free graph of the schema dependencies, removing any cyclic dependencies by eliminating any dependency from a first schema to a second schema if a dependency from the second schema to the first schema already exists in the cycle-free graph;
using a first delivery mechanism to deliver software objects of a first database type to a first of the plurality of schemas in a software object database, by traversing the cycle-free graph and delivering to the first of the plurality of schemas any software object, of the first database type, corresponding to a traversed node in the cycle-free graph;
using a second delivery mechanism to deliver software objects of a second database type to a second of the plurality of schemas in the software object database, by traversing the cycle-free graph and delivering to the second of the plurality of schemas any software object, of the second database type, corresponding to a traversed node in the cycle-free graph;
using the cycle-free graph; and
delaying deployment of any software objects of the first or second database type that do not correspond to a traversed node in the cycle-free graph until first use of the software object of the first or second database type that do not correspond to a traversed node in the cycle-free graph.

16. The non-transitory machine-readable storage medium of claim 15, wherein the delivering includes:
reading a list of objects defined in a change list;
identifying groups of objects from the change list that are to be created in different schemas;
determining a deploy sequence of the groups of objects; and
deploying the groups of objects based on the determined deploy sequence.

17. The non-transitory machine-readable storage medium of claim 16, wherein the deploying the groups of objects based on the determined deploy sequence includes, for each object in each group of objects:
  reading an object definition for the object from a definition store;
  writing the object definition to a schema for the object;
  writing a configuration to the schema for the object by converting a logical name for the schema to a physical name for the schema; and
  creating the object in the schema for the object.

18. The non-transitory machine-readable storage medium of claim 16, wherein the deploy sequence places objects that reference objects in other schemas first.

19. The non-transitory machine-readable storage medium of claim 15, wherein the first schema is a relational database schema.

20. The non-transitory machine-readable storage medium of claim 15, wherein the second schema is an in-memory database schema.

* * * * *